United States Patent
Deike et al.

[11] Patent Number: 5,867,918
[45] Date of Patent: Feb. 9, 1999

[54] GAS DRYER WITH AN OUTLET CHAMBER

[75] Inventors: Karl-Heinz Deike, Pattensen; Wolfgang Pohl, Garbsen, both of Germany

[73] Assignee: WABCO GmbH, Hanover, Germany

[21] Appl. No.: 886,639

[22] Filed: Jul. 1, 1997

[30] Foreign Application Priority Data

Jul. 4, 1996 [DE] Germany .................... 196 26 956

[51] Int. Cl.⁶ .................................................. F26B 19/00
[52] U.S. Cl. ................. 34/71; 34/82; 34/85; 137/204; 303/118.1
[58] Field of Search ................... 34/71, 79, 80, 34/82, 85; 417/297, 298; 137/203, 204; 303/28, 40, 118.1; 96/112, 113, 114; 55/213, 215

[56] References Cited

U.S. PATENT DOCUMENTS

| | | | |
|---|---|---|---|
| 4,493,510 | 1/1985 | Deike et al. | 303/28 |
| 4,764,189 | 8/1988 | Yanagawa et al. | 96/114 |
| 5,118,169 | 6/1992 | Möller | 303/118.1 |
| 5,522,150 | 6/1996 | Schultz | 34/80 |
| 5,639,224 | 6/1997 | Schlossarczyk et al. | 417/298 |
| 5,689,893 | 11/1997 | Mitsch | 34/80 |
| 5,715,621 | 2/1998 | Mitsch | 34/80 |

FOREIGN PATENT DOCUMENTS

| | | |
|---|---|---|
| 0 497 570 A1 | 8/1992 | European Pat. Off. . |
| 0 530 019 A2 | 3/1993 | European Pat. Off. . |
| 35 04 884 A1 | 7/1986 | Germany . |
| 35 23 403 A1 | 1/1987 | Germany . |
| 35 23 406 A1 | 1/1987 | Germany . |
| 35 23 407 A1 | 1/1987 | Germany . |
| 35 33 893 C2 | 3/1987 | Germany . |
| 195 23 219 A1 | 1/1997 | Germany . |
| 21 79 8781 | 3/1987 | United Kingdom . |
| WO 94 26 569 A1 | 11/1994 | WIPO . |

OTHER PUBLICATIONS

WABCO "Aus unserer Entwicklung", Lufttrockner, Hans–Rudolf Schlaphoff, pp. 31–33 (1983), with English translation.

Primary Examiner—Henry Bennett
Assistant Examiner—Steve Gravini
Attorney, Agent, or Firm—Proskauer Rose LLP

[57] ABSTRACT

A gas dryer having a housing, an outlet chamber, a pressure relief space, and a connection connecting the outlet chamber to the pressure relief space. An outlet valve is located within the connection connecting the outlet chamber to the pressure relief space. A piston which actuates opening and closing of the outlet is subjected to pressure contained in a control chamber. This pressure urges the outlet valve into an open position. The gas dryer also has an auxiliary valve system which is located between the control chamber and the pressure relief space. The auxiliary valve system controls the flow of the pressure medium between the control chamber and the relief space.

8 Claims, 2 Drawing Sheets

GAS DRYER WITH AN OUTLET CHAMBER

BACKGROUND OF THE INVENTION

The instant invention relates to a gas dryer having an outlet chamber that is connected to a pressure relief space by an outlet valve. The gas dryer is capable of removing moisture from gas that flows therein.

A gas dryer of this type operating with air as gas is known from FIGS. 2 and 3 of the article "Lufttrockner" (which means air dryer) on the pages 31 through 33 of the WABCO-publication "Aus unserer Entwicklung 1983" (which means "From our development 1983"). This air dryer functions according to the known adsorption principle. In the outlet chamber of this air dryer there accumulates condensation. In regeneration phases of the known dryer, the outlet valve which controls the connection between the outlet chamber and an outflow to the atmosphere is opened, so that the condensation accumulated is able to escape from the outlet chamber in these phases. Additionally, the regeneration gas stream which is due to the work principle of this air dryer can escape through the outlet chamber and the outflow in these phases. The atmosphere serves as pressure relief space in this case. The piston that actuates the outlet valve is subjected to the pressure in the control chamber in the opening direction of the outlet valve. That pressure is fed to the control chamber in idling phases of the compressor from a dried air pressure reservoir via a control line, a pressure regulating member and a control connection of the dryer. The control line and the control chamber form a dead end for the pressure medium that has entered into them so that water that may have entered the control line and the control chamber with the pressure medium may settle in the line and in the chamber. This water may originate from residual moisture of the pressure means, in particular as a result of malfunctions and/or critical operating states. This water may result in corrosion. This water may also freeze and thereby block the control line and/or the piston of the outlet valve, thus preventing the opening of the same.

Any of the above mentioned conditions may result in serious malfunctions and even in the failure of the gas dryer and/or cause serious malfunctions in the consumption devices located downstream of the gas dryer.

SUMMARY OF THE INVENTION

It is the object of the present invention to increase the operating safety of a gas dryer using simple means.

This object is attained by the present invention which comprises a gas dryer having a housing, an outlet chamber, a pressure relief space, and a connection connecting the outlet chamber to the pressure relief space. An outlet valve is located within the connection connecting the outlet chamber to the pressure relief space. A piston which actuates opening and closing of the outlet is subjected to pressure contained in a control chamber. This pressure urges the outlet valve into an open position.

The gas dryer also has an auxiliary valve system which is located between the control chamber and the pressure relief space. The auxiliary valve system controls the flow of the pressure medium between the control chamber and the relief space.

The gas dryer described above is suitable for gas dryers of any design. In addition, this gas dryer can be used in conjunction with the adsorption principle, the condensation principle as well as those dryers that combine both principles.

In addition, the gas dryer is applicable for operation with all types of gases. Mainly, the gas used in the gas dryer is air. When the gas used is air, the atmosphere functions as the pressure relief chamber. However, when a gas other than air is used, normally a collection container under atmospheric pressure serves as the pressure relief chamber.

Automotive technology is an important area in which the gas dryers of this type are used to dry compressed air.

Additional advantages of the invention will be apparent from the embodiments shown in the figures and described below.

BRIEF DESCRIPTION OF THE INVENTION

The same reference numbers are used throughout for components having the same function.

DETAILED DESCRIPTION OF THE INVENTION

Figure 1:
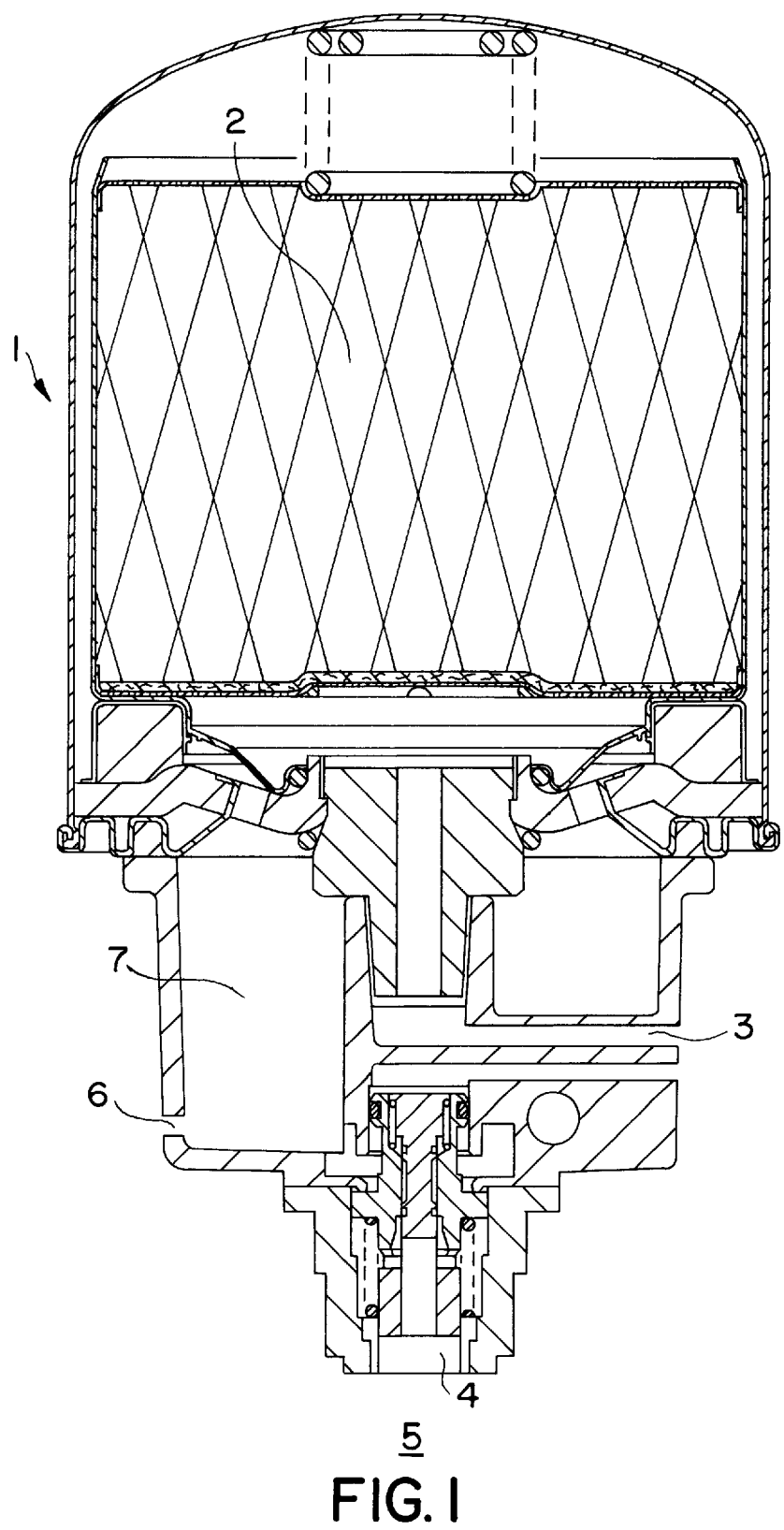
FIG. 1 illustrates the inventive gas dryer.

FIG. 1 shows a gas dryer having an inlet (6) and an outlet chamber (7). A stream of wet, compressed gas is fed into the gas dryer shown in FIG. 1 by the inlet (6). The compressed wet gas enters an outlet chamber (7), then flows through a drying cartridge (1) and exits at an operating outlet (3) connected to downstream consumption devices.

In the outlet chamber (7) water contained in the gas stream is condensed. The drying cartridge (1) contains an adsorption product (2) which further adsorbs water from the wet gas stream. The gas stream emerging from the operating outlet (3) is substantially dry.

Other means suitable for water separation, such as condensation surfaces, can be used in addition to or instead of the adsorption product and/or the drying cartridge (1).

The water absorption capacity of the gas dryer is limited by its capacity to accept condensation, or the adsorption capacity of the adsorption product. Therefore, the gas dryer must be regenerated. The gas drier is switched over to regeneration phases at opportune times. For this purpose an outlet valve which controls the connection between the outlet chamber (7) and a pressure relief space (5) is provided in the gas dryer.

The pressure relief space (5) is at atmospheric pressure. In the embodiment of the invention shown in FIG. 1 the surrounding atmosphere into which an outflow (4) of the gas dryer is released serves as the pressure relief space (5). The embodiment shown in FIG. 1 is therefore especially well suited for air as the gas being used. To protect against the entry of pollutants, the outlet of the outflow (4) is secured by a known diaphragm type flap valve (not shown) which opens into the atmosphere and locks in the opposite direction.

If a gas other than air is used, the outflow (4) is connected to a collection container which acts as the pressure relief space (5). The gas collected in the collection container is fed back into the operating process.

Figure 2:
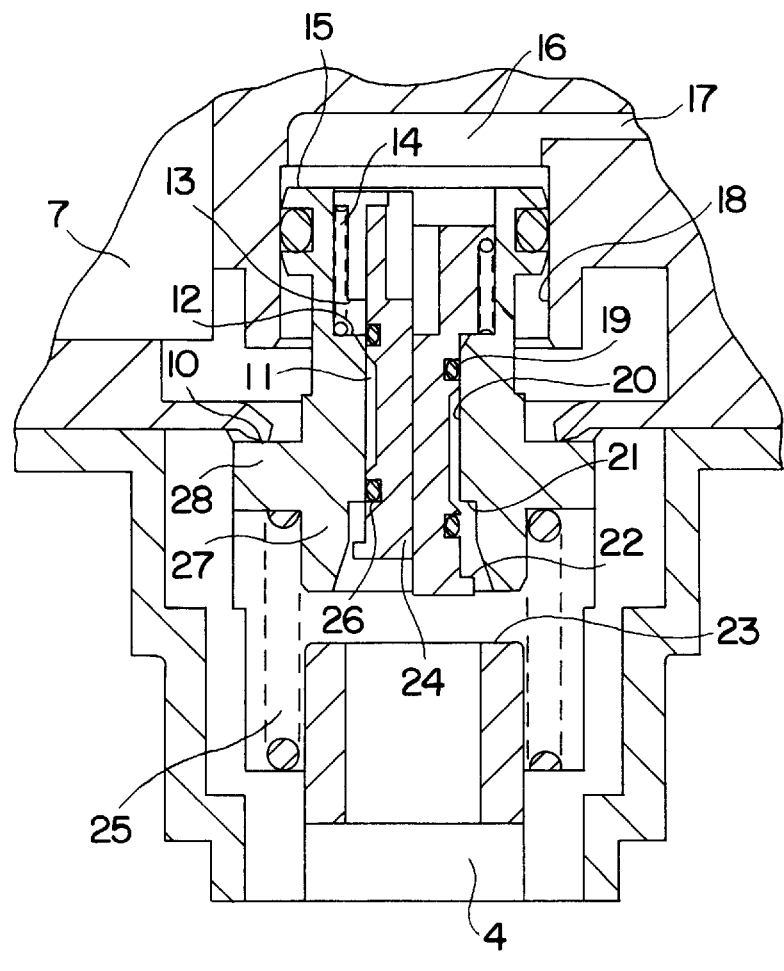
FIG. 2 illustrates the gas dryer of FIG. 1 in further detail.

FIG. 2 shows details of the outlet valve (10, 28). The outlet valve (10, 28) is formed by a sealing area (10) in the shape of a circumferential valve seat located on the housing and a sealing area (28) in the shape of a circumferential sealing seat made on a valve body (27). A closing spring (25) having two ends presses one end against the external flange and the other end against the housing. In this position the closing spring (25) pushes the valve body (27) upward, against the sealing area (10), thereby closing the outlet valve (10, 28), as shown.

Seen from the outlet valve (10, 28), the valve body (27) first penetrates through the outlet chamber (7) and then enters into a housing bore (18). The valve body (27) is guided inside the housing bore (18) in which it is sealed. As a result of this seal, the valve body (27) separates the outlet chamber (7) from a control chamber (11, 16) which is installed on the other side of the seal in the housing. The control chamber (11, 16) is subjected to pressure via a control connection (17). The surface of the valve body (27) which is subjected to the pressure fed to the control chamber (11, 16) acts as a piston surface (15). Therefore, the valve body (27) also acts as a piston for the actuation of the outlet valve (10, 28).

It is of course also possible to use a design in which the valve body and the piston are separated from each other in a known manner.

The above mentioned switch-over to regeneration phases begins by feeding pressure into the control chamber (11, 16). If the force exerted by this pressure via the piston surface (15) on the valve body (27) is strong enough to overcome both the force of the closing spring (25) and the frictional force acting upon the valve body (27), the pressure force moves the valve body (27) against the force of the closing spring (25). This movement of the valve body (27) is limited by a housing stop (23). When the valve body (27) moves, the outlet valve (10, 28) opens and thereby establishes a connection via the outflow (4) between the outlet chamber (7) and the pressure relief space (5). In the regeneration phase which is thus created, the condensation accumulated in the outlet chamber (7) is blown out through the open outlet valve (10, 28). Further in this phase, as is generally the case with gas dryers working on the adsorption principle, a stream of a dry unpressurized gas is conveyed back through the adsorption product (2) into the outlet chamber (7), through the open outlet valve (10, 28) and exits the outflow (4) into the pressure relief space (5). The stream of dry unpressurized gas may be conveyed back through the adsorption product (2) into the outlet chamber (7) from the operating outlet (3) or by some other route.

At the end of the regeneration phase the pressure is removed from the control chamber (11, 16), and the closing spring (25) returns the valve body (27) back to the position in which the outlet valve (10, 28) is closed.

The regeneration phases are normally coupled to idling phases of the compressor which produces the pressure of the gas stream. This is done by supplying the pressure of the control chamber (11, 16) required for the regeneration phase in a known manner and by known devices during the switch-over of the compressor from load phases into idling phases or thereafter and by exhausting the control chamber (11, 16) when or before the compressor is shifted back to load phases.

In addition, FIG. 2 shows an auxiliary valve system (19, 20, 24, 26) which controls the connection between the control chamber (11, 16) and the pressure relief space (5). This auxiliary valve system (19, 20, 24, 26) is integrated into the valve body (27) in order to achieve a low-cost and/or space-saving construction.

For this purpose the valve body (27) is perforated between its end facing the outflow (4) and the piston surface (15). An auxiliary valve body (24) is able to move between two positions in the perforation (20).

The auxiliary valve body (24) has sealing areas (19) and (26) at two locations along its longitudinal extension. These sealing areas are in the form of circumferential sealing rings, such as O-rings. The inner surface of the perforation (20) of the valve body (27) is made so as to provide complementary sealing areas that extend over the entire valve body (27) or only in the areas which come into contact with the sealing areas (19) and (26) of the auxiliary valve, body (24). Each sealing area (19) or (26) of the auxiliary valve body (24) forms an auxiliary valve (19, 20) or (26, 20) with the area of the perforation (20) of the valve body (27) with which it comes into contact.

The auxiliary valve body (24) is shown in the left half of FIG. 2 in its first position and in the right half of FIG. 2 in its second position. Hereinafter the first position shall be called the operating position and the second position the pumping position.

As shown in FIG. 2, when the auxiliary valve body (24) is in the operating position, the upper first auxiliary valve (19, 20) is open and the lower second auxiliary valve (26, 20) is closed. When the auxiliary valve body (24) is in the pumping position, the first auxiliary valve (19, 20) is closed and the second auxiliary valve (26, 20) is open.

The control chamber (11, 16) comprises a first control chamber section (16) located upstream of the first auxiliary valve (19, 20), and a second control chamber section (11) located downstream of the first auxiliary valve (19, 20). Connection (17) empties out into the first control chamber section (16).

The left half of FIG. 2 shows that when the auxiliary valve body (24) is in the operating position, the open first auxiliary valve (19, 20) connects the two control chamber sections (11) and (16). At the same time, the closed second auxiliary valve (26, 20) separates the control chamber (11, 16) from the outflow (4). Separating the control chamber (11, 16) from the outflow (4) effectively separates the control chamber (11, 16) from the pressure relief space (5).

As shown in the right half of FIG. 2, when the auxiliary valve body (24) is in the pumping position the closed first auxiliary valve (19, 20) separates the two control chamber sections (11) and (16) from each other. At the same time, the open second auxiliary valve (26, 20) connects the second control chamber section (11) to the outflow (4). Connecting the second control chamber section (11) to the outflow (4) effectively connects the second control chamber section (11) to the pressure relief space (5).

The operating position of the auxiliary valve body (24) is determined by positioning a stop (22) of the auxiliary valve body (24) against a stop (21) of the valve body (27). Into this position the auxiliary valve body (24) is pre-stressed by a reset spring (14). The reset spring (14) is held between a diameter step (12) of the perforation (20) of the valve body (27) and a flange (not designated) of the auxiliary valve body (24).

The pumping position of the auxiliary valve body (24) is determined by positioning another stop (13) of the auxiliary valve body (24) against the diameter step (12) of the perforation (20) of the valve body (27). Between the stop (13) and the flange of the auxiliary valve body (24), one or several pressure fluid passages (not designated) extend between the stop (13) and the flange of the auxiliary valve body (24).

The cross-sections of the auxiliary valve body (24) which are enveloped by its sealing areas (19 and 26) represent piston surfaces which are subjected to the pressure in the control chamber (11, 16). In the operating position of the auxiliary valve body (24), the piston surface associated with its second sealing area (26) is active. In the pumping position of the auxiliary valve body (24), the piston surface associated with its first sealing area (19) is active. Since the auxiliary valve body (24) has piston surfaces, the auxiliary valve body (24) is also an auxiliary piston. The auxiliary piston is subjected to the pressure in the control chamber (11, 16) and activates the auxiliary valve system (19, 20, 24, 26).

As explained earlier, the switch-over of the gas dryer into a regeneration phase takes place by feeding pressure to the control chamber (11, 16) via the control connection (17). This pressure, in addition to actuating the outlet valve (10, 28), also serves to actuate the auxiliary valve system (19, 20, 24, 26). When the pressure force generated by this pressure on the currently active piston surface is high enough so as to overcome the force of both the reset spring (14) and the frictional force on the auxiliary valve body (24), it displaces the auxiliary valve body (24) from the operating position to the pumping position. This causes the first auxiliary valve (19,20) to close and the second auxiliary valve (26, 20) to open. Thereby, the control chamber sections (11) and (16) are separated from each other and the second control chamber section (11) is connected to the outflow (4). When the second control chamber section (11) is connected to the outflow (4) it is effectively connected to the pressure relief space (5).

The gas volume contained in the second control chamber section (11) when the first auxiliary valve (19, 20) closed and the second auxiliary valve (26, 20) began to open was subjected to that pressure which prevailed in the control chamber (11, 16) in the moment the first auxiliary valve (19, 20) closed. As the second auxiliary valve (26, 20) is opened, the pressure drops, and water which may have accumulated in the second control chamber section (11) is carried off with the gas which eventually escapes into the pressure relief space (5). The water that is carried off with the gas volume may be in the form of condensation or water vapor.

Following the pressure drop in the first control chamber section (16) and hence the end of the regeneration phase, the auxiliary valve body (24) returns back to the operating position under the force of the reset spring (14), thereby restoring the connection between the control chamber sections (11) and (16) and closing the connection between the second control chamber section (11) and the pressure relief space (5). In the subsequent operating phase of the gas dryer and in the following regeneration phase before closing of the first auxiliary valve (19, 20), new gas passes from the first control chamber section (16) into the second control chamber section (11) and escapes again in the following regeneration phase while again carrying off accumulated water as described above.

The auxiliary valve system (19, 20, 24, 26) therefore causes part of the control chamber volume to be pumped off and to be replaced at every change-over between an operating phase and a regeneration phase of the gas dryer. Therefore, a large number of change-overs creates a flow of gas through the control chamber and the control line connected to it via the control connection (17). This flow of gas is accompanied by a removal of water which may have accumulated in the control line and/or in the control chamber.

Based on its operation, the auxiliary valve system (19, 20, 24, 26) can in general terms be considered a double valve which controls the flow of pressure medium through a connection between said first and second sections of control chamber (11, 16) and the flow of said pressure medium between said second section (11) of the control chamber (11, 16) and said pressure relief space (5). In the embodiment shown in FIG. 2, the latter control chamber section is represented by the second control chamber section (11).

This configuration makes it possible to obtain a combined actuation of outlet valve (10, 28) and auxiliary valve system (19, 20, 24, 26). In this configuration, a suitable coordination of the forces of the closing spring (25) and of the reset spring (14) and of the pressure forces acting against them determines which of the valve bodies (24) and (27) is displaced first and whether the outlet valve (10, 28) or the auxiliary valve system (19, 20, 24, 26) is to be actuated first.

The first and the second sealing areas (19) or (26) can optionally be located on the auxiliary valve body (24) so that either the auxiliary valves (19, 20, or 26, 20) are opened or closed simultaneously, or so that the first auxiliary valve (19, 20) closes before the second auxiliary valve (26, 20) opens. The first and the second sealing areas (19) and (26) can also be located on the auxiliary valve body (24) in such manner that the second auxiliary valve (26, 20) opens before the closing of the first auxiliary valve (19, 20). In this manner it is possible to increase the pumping action obtainable with the auxiliary valve system (19, 20, 24, 26). However, in this case, it is necessary to provide a coordination between the cross-section of the first auxiliary valve (19, 20) and the gas stream fed to the control chamber (11, 16) so that in spite of pressure loss through the auxiliary valves (19, 20 and 26, 20), a pressure high enough to open the outlet valve (10, 28) and, if necessary, to close the first auxiliary valve (19, 20) is obtained.

For the sake of completeness it should also be mentioned that the pressure force acting upon the currently active piston surface of the auxiliary valve body (24) is transmitted through either the reset spring (14) or the stop (13) to the valve body (27) of the outlet valve (10, 28). For this reason, the piston surface (15) is the entire surface of the valve body (27) and is enclosed by its seal in the housing bore (18).

The design of both the valve body (27) and of the auxiliary valve body (24) as piston of either the outlet valve (10, 28) or auxiliary piston for the actuation of the auxiliary valve system (19, 20, 24, 26), allows for a simple, compact and/or low-cost construction. It is of course possible for both or one of the above-mentioned pistons to be separate components.

In another embodiment, the auxiliary valve system can also be made and placed as an independent unit. For example, the auxiliary valve body could be located in a housing perforation going out from the control chamber, and also connected to the outflow. In this case, the auxiliary valves would be formed by sealing areas of the auxiliary valve body and of the housing perforation.

The auxiliary valve system can also be actuated in any suitable manner other than by the pressure in the control chamber. For example, the auxiliary valve system can also be actuated by a solenoid. This applies to a design wherein the outlet valve is integrated in the valve body, as well as to a design wherein the outlet valve is of an autonomous construction.

In another embodiment, the auxiliary valve system can also be designed so that the connection between control chamber and pressure relief space can be used to decrease the pressure in the control chamber and thereby terminate the regeneration phase. The auxiliary valve system can also be designed so that it is actuated during the operating phases of the gas dryer. These statements apply to all types of actuation. When the auxiliary valve system is actuated by pressure, a dedicated control chamber can be provided for the auxiliary valve system, or the response pressures of outlet valve and auxiliary valve system can be stepped in such a manner that the auxiliary valve system opens the connection between control chamber and pressure relief space without opening of the outlet valve. For these embodiments the auxiliary valve system does not have to be made in the form of a double valve but can also be a single valve.

In another embodiment, the auxiliary valve system is made in the form of a seat valve. On the other hand, the outlet valve can be made in the form of a sliding valve.

The person schooled in the art recognizes that the embodiments of the examples described above and the above-mentioned possibilities for designs do not exhaust the area of protection of the invention, but that all embodiments with characteristics as mentioned in the claims fall under their protection.

We claim:

1. A gas dryer comprising:
    an outlet chamber, a pressure relief space, and a connection connecting said outlet chamber to said pressure relief space;
    an outlet valve located within said connection connecting said outlet chamber to said pressure relief space;
    a piston which actuates opening and closing of said outlet valve;
    a control chamber receiving a pressure medium, said piston being subjected to the pressure in said control chamber to urge said outlet valve into an open position; and
    an auxiliary valve system located between said control chamber and said pressure relief space which controls the flow of said pressure medium between said control chamber and said pressure relief space.

2. The gas dryer of claim 1 wherein:
    said control chamber has a first section and second section; and
    said auxiliary valve system comprises a double valve which controls the flow of said pressure medium through a connection between said first and second sections of the control chamber, and the flow of said pressure medium between said second section of the control chamber and said pressure relief space.

3. The gas dryer of claim 2 wherein said auxiliary valve system closes said connection between said first and second control chamber sections before opening said connection between said second control chamber section and said pressure relief space.

4. The gas dryer of claim 1 further comprising a valve body and an auxiliary valve body, wherein said outlet valve is formed by a sealing area of said housing and a sealing area of said valve body, said valve body being perforated; and
    said auxiliary valve system is formed by a sealing area of said valve body and a sealing area of said auxiliary valve body, said auxiliary valve body being displaced in the perforation of said valve body.

5. The gas dryer of claim 2 further comprising a valve body and an auxiliary valve body, wherein said outlet valve is formed by a sealing area of said housing and a sealing area of said valve body, said valve body being perforated; and
    said auxiliary valve system is formed by the contact of at least one sealing area of said valve body with two sealing areas of said auxiliary valve body, said auxiliary valve body being displaced in said perforation of said valve body.

6. The gas dryer of claim 1 further comprising an auxiliary piston subjected to the pressure in said control chamber, said auxiliary piston actuating said auxiliary valve system.

7. The gas dryer of claim 4 further comprising an auxiliary piston subjected to the pressure in said control chamber, said auxiliary piston actuating said auxiliary valve system; and said auxiliary valve body being constructed to serve as said auxiliary piston.

8. The gas dryer of claim 5 further comprising an auxiliary piston subjected to the pressure in said control chamber, said auxiliary piston actuating said auxiliary valve system; and said auxiliary valve body being constructed to serve as said auxiliary piston.

* * * * *